(12) United States Patent
Dabrowski et al.

(10) Patent No.: US 7,574,812 B2
(45) Date of Patent: Aug. 18, 2009

(54) PIVOT PLATE LEVELER

(75) Inventors: Peter Dabrowski, Macomb, MI (US); Steven Michael Gwozdek, Tecumseh, MI (US)

(73) Assignee: Masco Corporation, Taylor, MI (US)

( * ) Notice: Subject to any disclaimer, the term of this patent is extended or adjusted under 35 U.S.C. 154(b) by 82 days.

(21) Appl. No.: 11/621,223

(22) Filed: Jan. 9, 2007

(65) Prior Publication Data

US 2008/0163506 A1 Jul. 10, 2008

(51) Int. Cl.
*E04B 5/00* (2006.01)
*A47K 3/16* (2006.01)

(52) U.S. Cl. .................... 33/333; 33/365; 33/375; 33/568; 33/1 BB; 52/126.1; 248/188.2

(58) Field of Classification Search ............ 33/333, 33/340, 347, 351, 365, 370, 371, 374–377, 33/379, 381, 384, 385, 390, 451, 562, 563, 33/613, 645, 567, 567.1, 568, 573, 1 BB, 33/366.11, 526–528, 533; 108/1, 6, 8, 102, 108/103; 248/649, 673, 677, 678, 346.05, 248/349.1, 188.1–188.3, 188.8; 52/126.1, 52/126.5–126.7, 365, 366
See application file for complete search history.

(56) References Cited

U.S. PATENT DOCUMENTS

| | | | | |
|---|---|---|---|---|
| 3,491,977 A * | 1/1970 | Iller | | 248/634 |
| 4,100,714 A * | 7/1978 | Stith, Jr. | | 52/741.1 |
| 4,554,590 A * | 11/1985 | Chelin et al. | | 348/827 |
| 4,566,664 A * | 1/1986 | Donald | | 248/349.1 |
| 4,659,053 A * | 4/1987 | Holley et al. | | 248/663 |
| 4,669,696 A * | 6/1987 | Petta | | 248/550 |
| 4,848,003 A * | 7/1989 | Westphal et al. | | 33/384 |
| 4,974,801 A * | 12/1990 | Pulsifer | | 248/181.2 |
| 5,063,679 A * | 11/1991 | Schwandt | | 33/347 |
| 5,442,882 A * | 8/1995 | Repasky | | 52/105 |
| 5,456,014 A * | 10/1995 | Wilson | | 33/390 |
| 6,019,154 A * | 2/2000 | Ma et al. | | 156/580 |
| 6,481,111 B1 * | 11/2002 | Myrick | | 33/526 |
| 6,516,531 B2 * | 2/2003 | Woerlein et al. | | 33/562 |
| 6,871,412 B2 * | 3/2005 | Markeson | | 33/358 |
| 7,428,802 B2 * | 9/2008 | Fukura et al. | | 52/506.05 |
| 2008/0163506 A1 * | 7/2008 | Dabrowski et al. | | 33/333 |
| 2008/0179470 A1 * | 7/2008 | Dabrowski | | 248/188.2 |

FOREIGN PATENT DOCUMENTS

JP 2006305110 A * 11/2006

OTHER PUBLICATIONS

Translation of Japanese Application JP 2006305110A provided from Japanese Translation website, translation performed May 16, 2008, pp. 1-10.*

* cited by examiner

*Primary Examiner*—Amy Cohen Johnson
(74) *Attorney, Agent, or Firm*—Nirav D. Parikh; Edgar A. Zarins

(57) ABSTRACT

An example pivot plate leveler includes a first plate having one of a protrusion and a cavity and a second plate having the other of the protrusion and the cavity. The first plate is pivotable with respect to the second plate to provide a level surface. An appliance is received on the level surface. In one example, the protrusion and the cavity are spherical. The protrusion is at least partially received within the cavity to provide a pivotable connection between the first plate and the second plate.

18 Claims, 3 Drawing Sheets

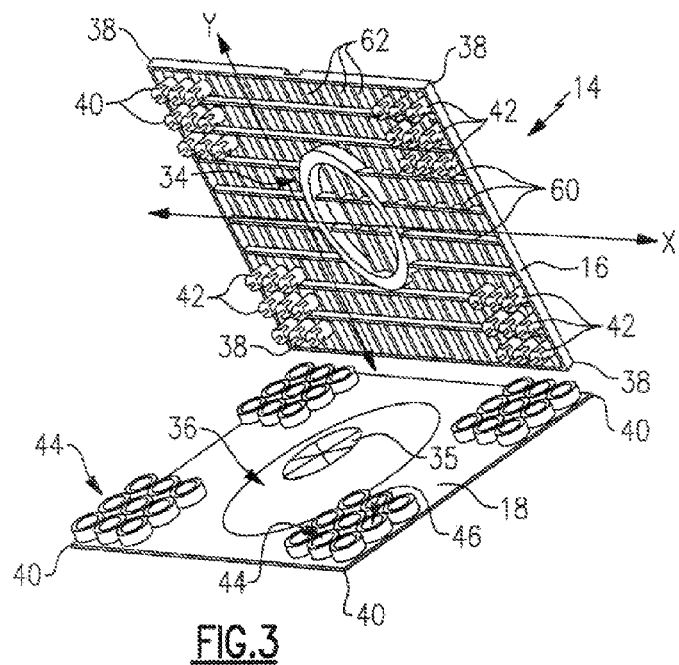
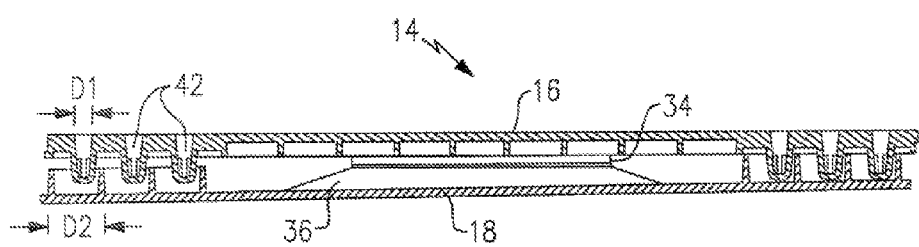

PIVOT PLATE LEVELER

BACKGROUND OF THE INVENTION

This invention generally relates to a leveling device, and more particularly to a pivotable leveling device for providing a level surface.

Numerous appliances, including but not limited to bathtubs, showers, cabinetry, furniture, washing machines, and refrigerators, require a level surface for proper positioning of the appliances at a desired location of an installation surface. An appliance positioned on an unlevel surface may be unstable with respect to the installation surface. This is often annoying to the appliance user and may detract from the overall functionality of the appliance.

Typically, installers of an appliance position the appliance at a desired location of the installation surface and subsequently determine whether the appliance is level at that location. If the appliance is not level, the installer must remove the appliance and level the surface. For example, with respect to bathtub installations, a bathtub is inserted into an alcove and the installer determines whether the bathtub is level within the alcove. If the bathtub is not level, the installer removes the bathtub and adds shims at a necessary location of the alcove. Next, the bathtub is reinserted into the alcove and the determination of whether the bathtub is level within the alcove is again made. This process is repeated until the bathtub reads level.

Disadvantageously, this process is time consuming. In addition, the use of shims may not always provide a completely level surface. The inability to provide a surface that is completely level may result in the subsequent instability of the appliance at the installation surface.

Accordingly, it is desirable to provide a leveling device for providing a level surface for an appliance prior to placing the appliance at a desired location of the installation surface.

SUMMARY OF THE INVENTION

An example pivot plate leveler includes a first plate having one of a protrusion and a cavity and a second plate having the other of the protrusion and the cavity. The first plate is pivotable with respect to the second plate to provide a level surface. An appliance is received on the level surface. In one example, the protrusion and the cavity are spherical. The protrusion is at least partially received within the cavity to provide the pivotable connection between the first plate and the second plate.

An example method for providing a level surface includes the steps of positioning a first plate on an installation surface, providing a portion of the first plate with an adhesive, positioning a second plate with respect to the first plate, and pivoting the second plate with respect to the first plate to provide a level surface. An appliance may be positioned on the level surface once the adhesive cures.

The various features and advantages of this invention will become apparent to those skilled in the art from the following detailed description. The drawings that accompany the detailed description can be briefly described as follows.

BRIEF DESCRIPTION OF THE DRAWINGS

FIG. 3 schematically shows an example feature of the pivot plate leveler illustrated in FIG. 2;

FIG. 4 is a cross-sectional view of the example pivot plate leveler illustrated in FIG. 2;

DETAILED DESCRIPTION OF THE PREFERRED EMBODIMENT

Figure 1:
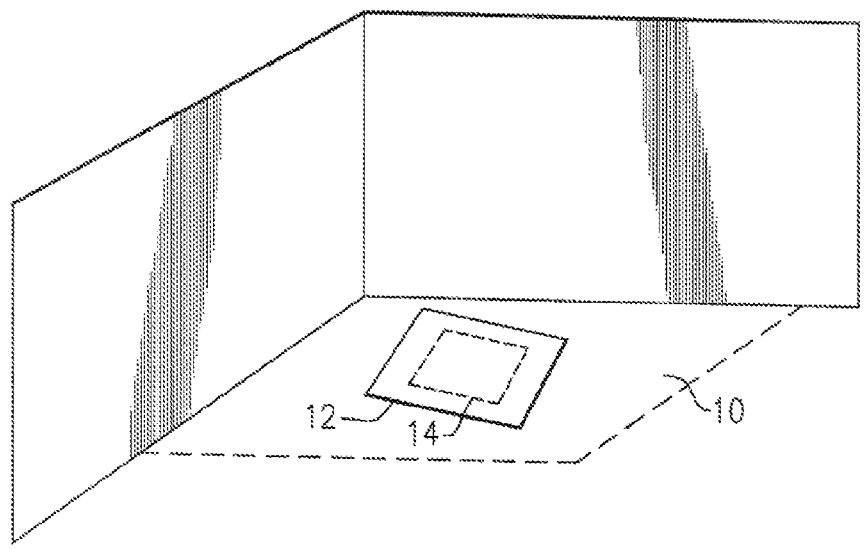
FIG. 1 illustrates the installation of an appliance with an example pivot plate leveler.

Referring to FIG. 1, an installation surface 10 is illustrated which requires a level surface for installation of an appliance 12. The installation surface 10 may include any surface, including home interior surfaces or exterior surfaces, at which an installer may wish to position an appliance 12. For example, the installation surface 10 may be an alcove which receives a bathtub unit. A pivot plate leveler 14 is positioned between the installation surface 10 and the appliance 12 to provide a level surface for the appliance 12. Although shown and described as a pivot plate leveler for a bathtub unit, it should be understood that the example pivot plate leveler may be utilized to provide a level surface for any type of appliance, including but not limited to bathtubs, showers, furniture, cabinetry, washers and dryers. The number of pivot plate levelers 14 required to provide a level surface for the installation of an appliance 12 will vary depending upon the size and shape of the appliance and other design specific parameters.

Figure 2:
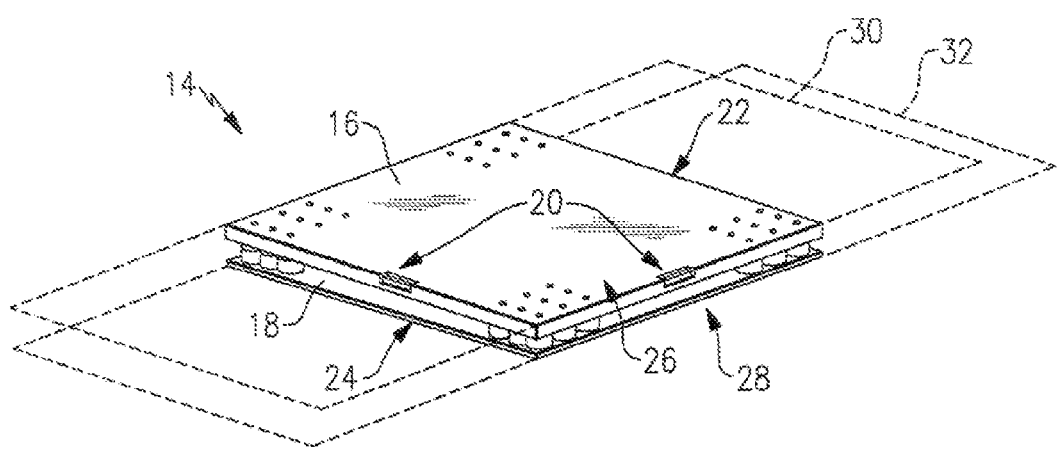
FIG. 2 illustrates a schematic view of an example pivot plate leveler.

Referring to FIG. 2, an example pivot plate leveler 14 includes a first plate 16 and a second plate 18. In one example, the pivot plate leveler 14 is comprised of plastic, although any known material may be utilized to fabricate the pivot plate leveler 14. The first plate 16 is pivotable with respect to the second plate 18, or visa versa. In one example, a plurality of bubble vials 20 are positioned at various locations of an outer periphery 22 of the first plate 16. In another example, the two bubble vials are positioned 90° from one another about the outer periphery 22 of the first plate 16. In yet another example, the second plate 18 also includes a plurality of bubble vials 20 positioned about an outer periphery 24 of the second plate 18.

The first plate 16 defines an exterior surface 26 and the second plate 18 defines an exterior surface 28. The exterior surface 26 of first plate 16 is defined within a first plane 30. The exterior surface 28 of the second plate 18 is defined within a second plane 32. In one example, the first plane 30 and the second plane 32 are generally parallel to one another.

Referring to FIG. 3, the first plate 16 includes a cavity 34 which extends inwardly from the first plane 30 in a direction transverse to the exterior surface 26. The second plate 18 includes a protrusion 36 which extends inwardly from the second plane 32 in a direction transverse to the exterior surface 28. It should be understood that an opposite configuration is possible, wherein the first plate 16 defines the protrusion 36 and the second plate 18 defines the cavity 34. The protrusion 36 includes a plurality of ribs 35. The ribs 35 provide structural support to the second plate 18.

The protrusion 36 and the cavity 34 are preferably defined near a center of the first plate 16 and the second plate 18. However, the cavity 34 and the protrusion 36 may be defined at other locations of the first plate 16 and the second plate 18. In one example, the cavity 34 and the protrusion 36 are spherical. Although the first plate 16 and the second plate 18 are shown having protrusions and cavities with spherical shapes, any other shapes could be utilized without departing from the principles of the present invention.

At least a portion of the protrusion 36 of second plate 18 is received within the cavity 34 of the first plate 16. Therefore, a "ball and socket" connection is defined between the first plate 16 and the second plate 18. The first plate 16 is pivotable with respect to the second plate 18. The first plate 16 pivots with respect to second plate 18 to provide a level surface, as is further discussed below.

In one example, the first plate 16 and the second plate 18 are rectangular in shape, although it should be understood that any other shapes may be utilized. The actual size and shape of the pivot plate leveler 14 will vary depending upon design specific parameters including the size and shape of the installation surface 10 as well as the size and shape of the appliance 12 being installed.

The first plate 16 defines a first set of support ribs 60 and a second set of support ribs 62. Each of the first and second set of support ribs 60, 62 extend inwardly from the first plane 30. That is, the support ribs 60, 62 extend inwardly from the exterior surface 26 in a parallel direction to the cavity 34. The first set of support ribs 60 extend along the first plate 16 in a first direction X, wherein each support rib 60 extends parallel to each neighboring support rib 60. The second set of support ribs 62 extend in a second direction Y. The support ribs 62 are aligned in a parallel configuration similar to the support ribs 60. The first direction X is preferably transverse to the second direction Y. The support ribs 60, 62 provide structural support to the pivot plate leveler 14 for supporting appliances 12 of varying sizes and weights. In another example, the second plate 18 defines a similar configuration of support ribs at its exterior surface 28.

Each of the first plate 16 and the second plate 18 define four corners 38, 40 respectively. In one example, a plurality of pegs 42 are defined near each corner 38 of the first plate 16. In another example, the plurality of pegs 42 are positioned about the outer periphery 22 of the first plate 16. The plurality of pegs 42 extend inwardly from the exterior surface 26 of the first plate 16 in a direction parallel to the protruding cavity 34.

The second plate 18 includes a plurality of pockets 44 near each of its corners 40. The positioning of the pockets 44 of the second plate 18 is in direct relationship to the positioning of the pegs 42 of the first plate 16. Therefore, the actual location of the plurality of pockets 44 on the second plate 18 will depend upon the positioning of the pegs 42 of first plate 16. In one example, each pocket 44 comprises a cylinder having a single, open end 46. Each pocket 44 is therefore capable of retaining a liquid, such as an adhesive, as is further discussed below. It should be understood that the actual number of pegs 42 and pockets 44 included on the first plate 16 and the second plate 18 will vary depending upon design specific parameters.

The pegs 42 are at least partially received within the pockets 44 and at least a portion of the protrusion 36 is received within the cavity 34 to assemble the pivot plate leveler 14. As shown in FIG. 4, the pegs 42 define a first diameter D1 and the pockets 44 define a second diameter D2. In one example, the second diameter D2 of the pockets 44 is at least twice as large as the first diameter D1. Therefore, as the first plate 16 pivots with respect to the second plate 18 via the cavity 34 and the protrusion 36, the pegs 42 have adequate space within the pockets 44 to shift while establishing the level surface. The size relationship between the first diameter D1 and the second diameter D2 of the pockets 44 and pegs 42 will depend upon the amount of pivot tilt required between the first plate 16 and the second plate 18.

Figure 5:
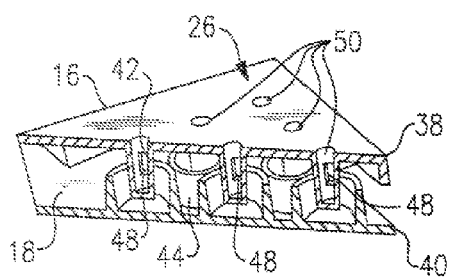
FIG. 5 illustrates an example feature of a corner of the example pivot plate leveler illustrated in FIG. 2.

Referring to FIG. 5, each peg 42 extends through the exterior surface 26 of the first plate to define a plurality of bores 50. The pegs 42 also define a plurality of openings 48. The bores 50 and the openings 48 aid in the attachment of first plate 16 to the second plate 18. That is, once the pockets 44 are provided with an adhesive and the pegs 42 are received within the pockets 44, the adhesive flows through the plurality of openings 48 and through the first plate 16 via the plurality of bores 50. Therefore, the position of the first plate 16 is securely fixed with respect to the second plate 18 once the adhesive cures.

Figure 6:
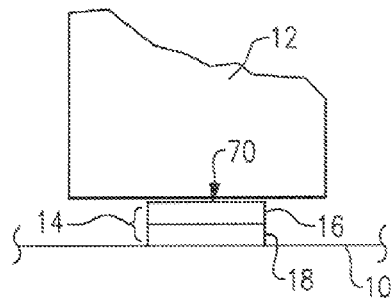
FIG. 6 illustrates a schematic view of an example pivot plate leveler that provides a level surface for an appliance.

Referring to FIG. 6, an appliance 12 is received on the pivot plate lever 14 once the first plate 16 and the second plate 18 are positioned at the installation surface 10. The pivot plate leveler 14 defines a level surface 70. Therefore, the appliance 12 is level once positioned on the pivot plate leveler 14 and mounted at the installation surface 10.

Figure 7:
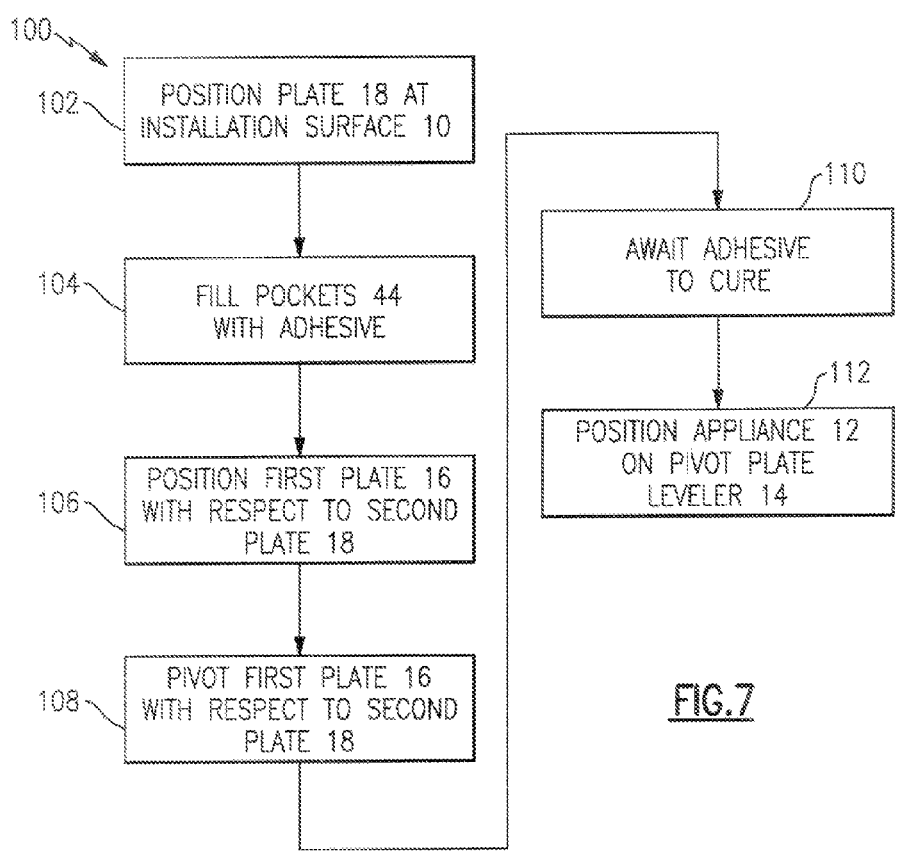
FIG. 7 is a block diagram illustrating an example method for providing a level surface.

Referring to FIG. 7, and with continuing reference to FIGS. 1-6, a method 100 for providing a level surface is illustrated. At step block 102, the second plate 18 is positioned at the installation surface 10. Although the example shown in FIG. 6 discloses placement of the second plate 18 as the bottom plate, it should be understood that the first plate 16 may also be positioned as the bottom plate. The second plate 18 is positioned at a specific location of the installation surface 10 and is rigidly affixed thereto. In one example, the second plate 18 is positioned near the center of the installation surface 10. However, the second plate 18 may be positioned anywhere within an area defined by the installation surface 10. In one example, the second plate 18 is rigidly affixed to the installation surface 10 with threaded fasteners. In another example, the second plate 18 is affixed with an adhesive.

The pockets 44 of the second plate 18 are at least partially filled with an adhesive at step block 104. The adhesive is poured into the open ends 46 of each pocket 44. In one example, the adhesive is a known epoxy, although any known adhesive may be utilized. The actual adhesive used with the pivot plate leveler 14 will depend upon numerous factors, including but not limited to the type of appliance being installed and the amount of curing time associated with the adhesive. One example adhesive includes a curing time of at least 10-15 minutes.

Next, at step block 106, the first plate 16 is positioned with respect to the second plate 18. The pegs 42 of the first plate 16 are received within the pockets 44 of the second plate 18. In addition, the protrusion 36 is at least partially received within the cavity 34. The adhesive contained within the pockets 44 flows around the pegs 42 and through the plurality of openings 48 defined by the pegs 42 such that the adhesive enters the plurality of bores 50 that extend through the exterior surface 26 of the first plate 16. Therefore, the first plate 16 is interlocked to the second plate 18 once the epoxy cures.

Prior to the curing of the adhesive, the first plate 16 is pivoted with respect to the second plate 18 to provide a level surface at step block 108. In one example, the first plate 16 is pivoted with respect to the second plate 18 by rotating the first plate 16 with respect to the second plate 18 via the protrusion 36 and the cavity 34 interface. The installer utilizes the bubble vials 20 to aid in the determination of whether the first plate 16 is level with respect to the second plate 18.

At step block 110, the installers wait for the adhesive to cure such that the first plate 16 is rigidly affixed with respect to the second plate 18. The method concludes at step block 112 where the appliance 12, such as a bathtub, for example, is positioned on the pivot plate leveler 14. Because the pivot plate leveler 14 provides a level surface, the appliance 12 is level once installed.

While it has been disclosed in the preceding examples that the first plate 16 defines the cavity 34 and the pegs 42, and the second plate 18 defines the protrusion 36 and the pockets 44, it should be understood that an opposite configuration (or any other configuration) is contemplated as within the scope of the invention that includes the first plate 16 defining the protrusion 36 and the pockets 44 and the second plate 18 defining the cavity 34 and the pegs 42.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A leveling device, comprising:
a first plate having one of a protrusion and a cavity; and
a second plate having the other of said protrusion and said cavity, wherein one of said first plate and said second plate is pivotable with respect to the other of said first plate and said second plate to provide a more level surface, and one of said first plate and said second plate includes a plurality of pegs and the other of said first plate and said second plate includes a plurality of pockets, wherein said plurality of pegs are selectively received within said plurality of pockets to position said first plate relative to said second plate, and said plurality of pegs each include an opening for receiving an adhesive.

2. The device as recited in claim 1, wherein at least one of said first plate and said second plate includes at least one bubble vial.

3. The device as recited in claim 1, wherein at least one of said first plate and said second plate includes a plurality of support ribs.

4. The device as recited in claim 1, wherein each of said plurality of pegs and said plurality of pockets are disposed about an outer periphery of one of said first plate and said second plate.

5. The device as recited in claim 1, wherein said plurality of pegs define a first diameter which is different from a second diameter defined by said plurality of pockets, wherein said second diameter is larger than said first diameter.

6. The device as recited in claim 1, wherein said protrusion comprises a spherical protrusion and said cavity comprises a spherical cavity, wherein said spherical cavity is pivotable with respect to said spherical protrusion, wherein said spherical protrusion is at least partially received within said spherical cavity.

7. A method for providing a level surface, comprising the steps of:
(a) positioning a first plate on an installation surface;
(b) providing at least a portion of the first plate with an adhesive including filling a plurality of pockets defined by the first plate with the adhesive;
(c) positioning a second plate with respect to the first plate including inserting a plurality of pegs defined by the second plate into the plurality of pockets and receiving a protrusion of one of the first plate and the second plate within a cavity of the other of the first plate and the second plate; and
(d) pivoting the second plate with respect to the first plate to provide a more level surface.

8. The method as recited in claim 7, wherein said step (a) comprises the step of:
locating the first plate at a desired location of the installation surface; and
rigidly attaching the first plate to the installation surface.

9. The method as recited in claim 8, wherein the step of locating the first plate at the desired location of the installation surface includes locating the first plate near a center of the installation surface.

10. The method as recited in claim 7, further comprising the step of:
(e) awaiting the adhesive to cure; and
(f) positioning an appliance on the level surface.

11. The method as recited in claim 10, wherein the appliance comprises a bathtub unit.

12. A leveling device, comprising:
an appliance; and
a leveler having a first plate and a second plate, said first plate adjustable relative to said second plate to provide a more level surface, wherein said appliance is received on said more level surface provided by said leveler, wherein each of said first plate and said second plate define four corners, and each corner of said four corners includes one of a plurality of pegs and a plurality of pockets, and wherein said plurality of pegs extend inwardly from an exterior surface of one of said first plate and said second plate, wherein each of said plurality of pegs define an opening.

13. The device as recited in claim 12, wherein said first plate includes one of a protrusion and a cavity and said second plate includes the other of said protrusion and said cavity, wherein said protrusion and said cavity are spherical.

14. The device as recited in claim 12, wherein said appliance comprises a bathtub unit.

15. A leveling device, comprising:
a first plate having one of a plurality of pegs and a plurality of pockets;
a second plate positioned relative to said first plate and including the other of said plurality of pegs and said plurality of pockets; and
an adhesive received within each of said plurality of pockets.

16. The device as recited in claim 15, wherein each of said plurality of pegs include an opening for receiving said adhesive.

17. The device as recited in claim 15, wherein said plurality of pegs and said plurality of pockets are each positioned at each corner of one of said first plate and said second plate, and said plurality of pegs are selectively received within said plurality of pockets.

18. The device as recited in claim 15, wherein one of said first plate and said second plate is pivoted with respect to the other of said first plate and said second plate to provide a more level surface for receiving an appliance.

* * * * *